United States Patent Office 3,425,650
Patented Feb. 4, 1969

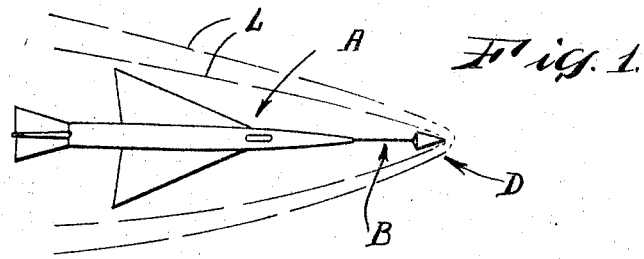
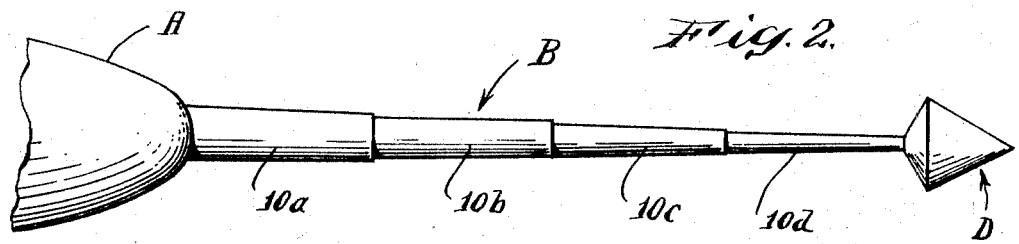
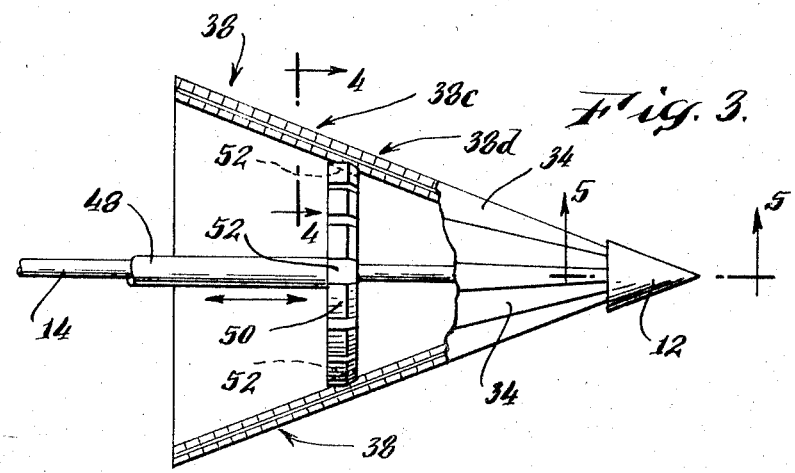
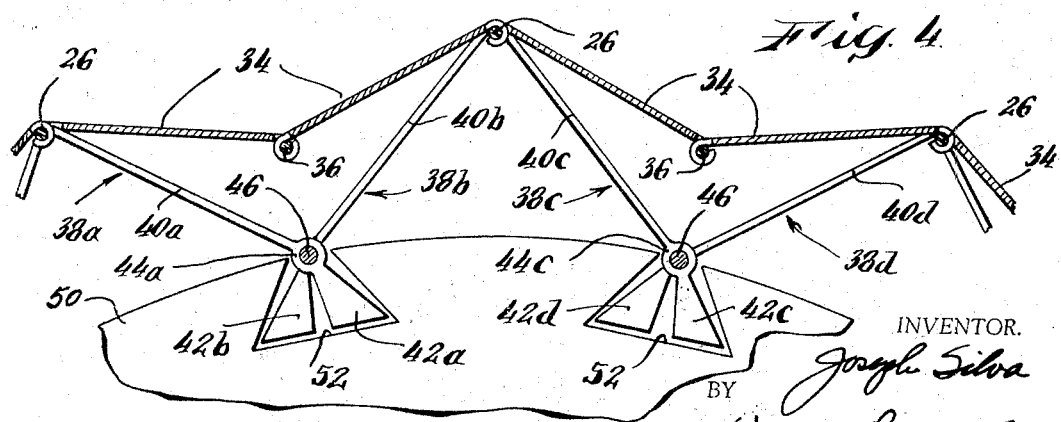

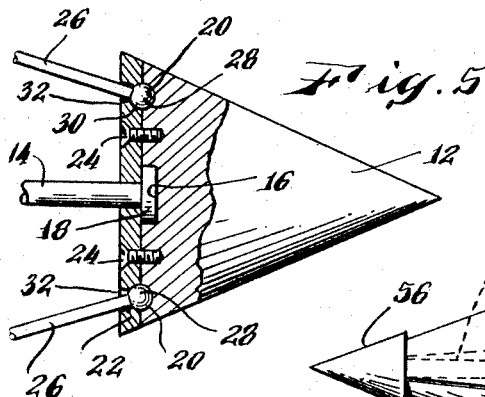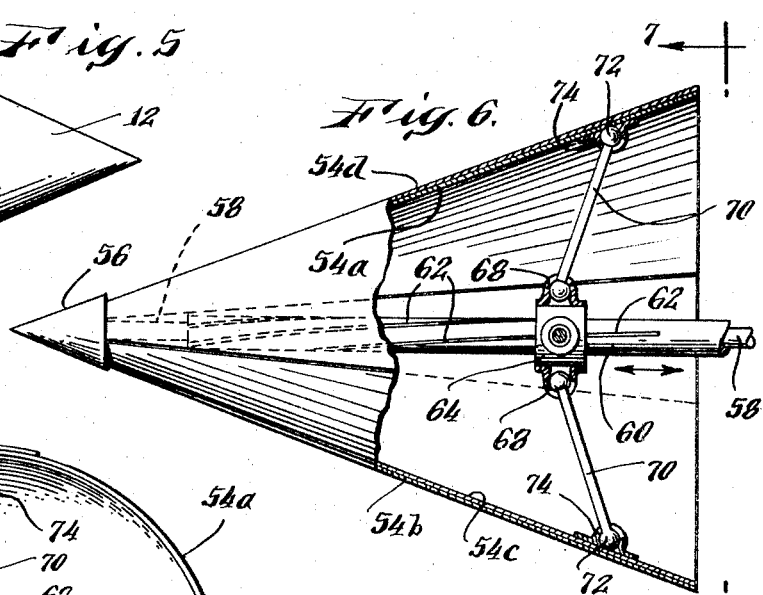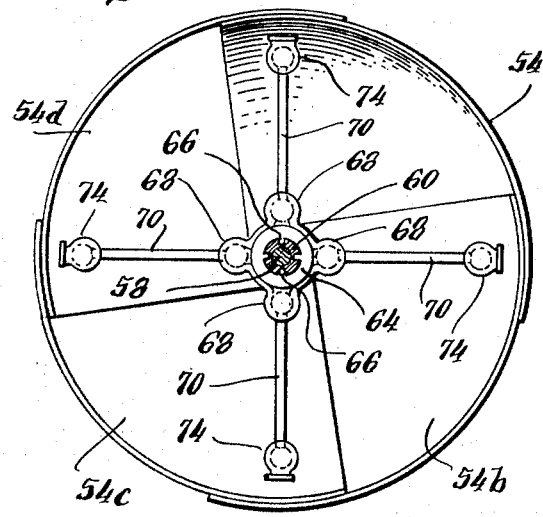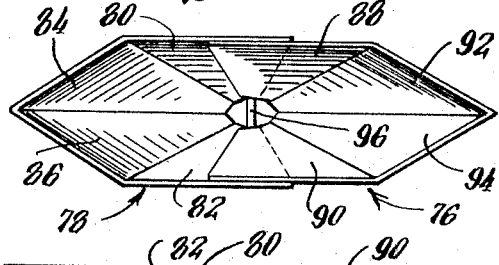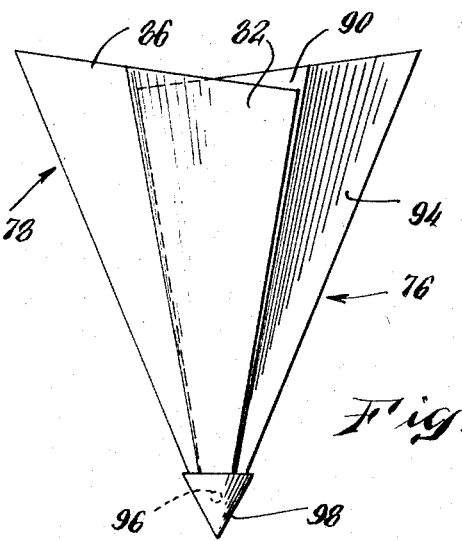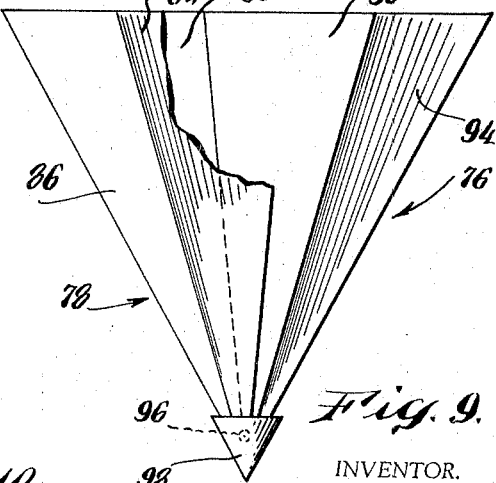

3,425,650
AIR DEFLECTOR FOR SUPERSONIC AIRCRAFT
Joseph Silva, Beacon Hill Terrace,
Huntington, Conn. 06484
Filed Oct. 2, 1967, Ser. No. 672,185
U.S. Cl. 244—130                                      7 Claims
Int. Cl. B64c 1/38

ABSTRACT OF THE DISCLOSURE

A device for deflecting air outwardly from a supersonic aircraft. A tapered deflector is mounted on the end of a boom extending forwardly from the nose of the aircraft.

Background of the invention

This invention relates to supersonic aircraft and, more particularly, to means for protecting such aircraft from the adverse effects of air friction at supersonic speeds.

A considerable amount of research and development is currently underway to develop commercially feasible aircraft capable of sustained flight at speeds in excess of the speed of sound and, hopefully, at speeds approaching twice the speed of sound. The "sonic barrier" as such no longer exists but the thermal barrier is both real and formidable. This barrier arises as a result of the intense heat created by the friction of high speed air flow along the surface of the aircraft. The high temperatures produced have a serious weakening effect on the skin and structural members of the aircraft as well as on windows, windshields, and other components of the aircraft. The solution to many of these problems is being sought by the substitution or incorporation of relatively exotic materials which retain their strength at high temperatures. Titanium is only one example of such materials. In addition to high cost, many of these materials present substantial problems as they are difficult to fabricate. Still other problems arise due to the heating of other elements, such as hydraulic fluid, with the resultant tendency to boil away such fluid.

In addition to the heating problem, air friction also increases the drag on the aircraft and it would be desirable to decrease this drag to provide more efficient and less costly operational costs.

Accordingly, it is the primary object of the present invention to provide a device effective in reducing air friction on supersonic aircraft. Other objects are to provide such a device which is relatively simple in construction and operation; which will reduce friction heating and drag; which will permit the use of lower temperature materials in aircraft construction; which will increase the efficiency of aircraft operation; and which will result in less costly aircraft construction.

Summary of the invention

The objects of this invention are achieved by means of a tapered air deflector mounted forwardly of the aircraft on a suitable support boom. The deflector may have either fixed or variable dimensions and is positioned to divert air outwardly of the aircraft. In addition, the boom upon which the deflector is mounted may be made adjustable in length.

Brief description of the drawings

The invention may be best understood by reference to the drawings wherein:

FIG. 1 is a plan view illustrating a supersonic aircraft provided with a deflector in accordance with this invention;

FIG. 2 is a side view of a deflector and telescoping boom mounted on the nose of an aircraft;

FIG. 3 illustrates a cone-shaped deflector of variable dimensions, partially broken away to illustrate its internal construction;

FIG. 4 is an enlarged cross section taken substantially along the line 4—4 of FIG. 3;

FIG. 5 illustrates one form of nose piece usable with the deflector of the present invention, partially broken away to illustrate its internal construction;

FIG. 6 is an elevational view of a modified form of conical deflector in accordance with the present invention, partially broken away to illustrate its internal construction;

FIG. 7 is a view taken substantially along the line 7—7 of FIG. 6;

FIG. 8 is a rear end view of still another modification of the deflector of this invention;

FIG. 9 is a plan view of the deflector of FIG. 8; and

FIG. 10 is a view similar to FIG. 9, showing the deflector in a collapsed position.

Description of the preferred embodiments

With particular reference to FIG. 1, there is illustrated in plan view a supersonic aircraft A having an elongated boom B extending forwardly from its nose and supporting at its end a conical deflector D. As the aircraft flies through the atmosphere, the air is deflected away from the aircraft as illustrated schematically by the lines L.

In FIG. 2 there is illustrated the nose of an aircraft A provided with a deflector D mounted upon a boom B of adjustable length. This boom comprises a series of telescopic segments 10a–d. The length of boom B is adjustable by varying the degree of telescoping and may be arranged to be adjustable by the pilot or automatically in accordance with aircraft speed, air density, friction heating, or other measurable quantities. The mechanism for accomplishing the telescoping function is not illustrated as such mechanism may be readily designed by one skilled in the art.

The deflector illustrated in FIG. 2 is of fixed dimensions and may be solid. It may be formed of a suitable heat resistant metal or ceramic. In any event, the shape of the cone will control the degree of deflection obtained at a given air speed and air density.

In order to achieve maximum flexibility and utility, it may be desirable to provide a deflector having variable dimensions which are controllable in flight. While any of a number of schemes may be employed to achieve such variation, three such schemes will now be described by way of illustration.

In FIGS. 3–5 there is illustrated a deflector of what may be termed an "umbrella" type as its mode of operation most nearly resembles that of the common umbrella. This construction includes a heat resistant end cone 12 mounted upon the end of a suitable support rod 14. Referring to FIG. 5 it will be noted that end cone 12 is substantially solid and that its base defines a recess 16 for receiving the enlarged head 18 of support rod 14. Around the periphery of the cone base are a plurality of semi-spherical pivot recesses 20. A cap plate 22 is mounted against the base of end cone 12 by means of suitable screws 24. A plurality of elongated ribs 26 are provided, each having an end ball 28. The cap plate 22 is provided with a plurality of semi-spherical recesses 30 which are aligned with the recesses 20 in end cone 12. An opening 32 extends rearwardly from each of recesses 30 through the cap plate 22. The ribs are mounted to extend through the openings 32 with the balls 28 being mounted in the sockets defined by recesses 20 and 30, thus providing pivotal ball and socket joints.

The skin of the umbrella type deflector is formed from identical triangular plates 34 of a suitable heat resistant material. One edge of each plate is hinged to one of the ribs 26 as shown in FIG. 4 and the edges which lie intermediate these ribs are connected by a hinge 36. It will now be apparent that, in order to vary the angle of the conical deflector, the ribs 26 must be caused to move radially inwardly and outwardly relative to the support rod 14, pivoting about their ends 28. This radial movement is supplied by a plurality of control arms 38. Four such arms are illustrated in FIG. 4 as 38a–38d. Each control arm includes an outer plate member 40, pivoted at its outer end to one of the ribs 26, and a flared lever arm 42. Intermediate the plate member and lever arm of each control arm is a cylindrical body portion 44 which defines an opening for receiving a central hinge pin 46. It will now be apparent that the umbrella shape of this deflector may be contracted or expanded by squeezing or separating the respective pairs of lever arms, i.e. 42c, 42d and 42a, 42b. This effect is achieved by means of a hollow control shaft 48 which surrounds support rod 14 and is axially movable relative to it. Mounted upon the end of the control shaft 48 is a control disc 50. Around the periphery of the control disc 50 are a plurality of dovetail slots 52, each slot containing respective pairs of lever arms 42. The bases of the slots are angled as illustrated in FIG. 3. It will now be apparent that the conical angle of the umbrella deflector of FIGS. 3–5 may be varied by merely sliding the disc 50 forwardly and rearwardly within the deflector. As it slides to the rear, for example, the dovetail configuration of the slots 52 retains the lever arms 42 therein but squeezes together the respective pairs and simultaneously pulls the assembly radially inward, thus tending to "close the umbrella" and increase the angle of intersection between the plates 34. Movement of disc 50 in the forward direction, on the other hand, will increase the conical angle.

An alternative construction for a variable volume cone-shaped deflector is illustrated in FIGS. 6 and 7. In this modification, the cone is formed from a plurality of overlapping curved plates 54a–54d. These plates are arranged on suitable pivots (not shown) within the end cone 56. The end cone 56, in turn, is mounted on the end of a support rod 58. A hollow control shaft 60 is axially slidable along support rod 58 and is machined with a plurality of spaced spiral grooves 62. A control ring 64 is mounted on the control shaft and includes inwardly projecting ribs 66 which engage the respective grooves. A series of sockets 68 on the periphery of the control ring retain the inner ball ends of a series of control rods 70, one control rod being provided for each of the curved plates 54. The outer end of each control rod 70 is secured to its respective plate by means of a ball 72 at its end and a socket 774 secured to the plate. It will now be apparent that, as the control shaft 60 is caused to move longitudinally on the support rod 58, the spiral groove 62 acting upon ribs 66 will rotate the control ring 64, thus varying the degree of overlap of plates 54 and changing the conical angle of the deflector.

A final version of a deflector usable in the invention is illustrated in FIGS. 8–10. With particular reference to FIGS. 8 and 9, it will be noted that this modification is not conical but is elongated as viewed from its rear. The deflector is formed from two interlocking half members 76, 78. Member 78 is formed with triangular side panels 80, 82 and end panels 84, 86. The half member 76 is of slightly smaller dimensions as it includes side panels 88, 90 which nest slidably within the side panels 80, 82. Member 76 also includes end panels 92, 94. The two half members are arranged upon a pivot 96 positioned within an end cone 98.

For purposes of simplicity, the specific mechanics for varying the degree of overlap between side panels 80, 82, and 88, 90 are not illustrated. However, a number of suitable alternatives will suggest themselves to those skilled in the art and may include, for example, a pair of pivoted push rods, the outer end of each rod being pivotally secured to one of the half members and the inner end being secured to a control shaft such as 48 of FIG. 3.

What I claim as new and desire to secure by Letters Patent of the United States is:

1. In a high speed aircraft, the improvement which comprises: elongated support means mounted on said aircraft and extending forwardly thereof; and a tapered air deflector positioned on said support means and spaced forwardly from said aircraft, the angle of taper being greater in a first plane containing the longitudinal axis of said support means than in a second plane containing said longitudinal axis and substantially perpendicular to said first plane.

2. The improvement of claim 1 wherein the length of said support means is adjustable.

3. The improvement of claim 2 wherein said support means is a telescoping boom.

4. The improvement of claim 1 wherein said first plane is substantially horizontal in level flight.

5. The improvement of claim 4 wherein the angle of taper in said first plane is selectively adjustable.

6. The improvement of claim 5 wherein said air deflector comprises first and second tapered half members in variable nesting engagement.

7. The improvement of claim 6 wherein each of said half members includes first and second substantially planar, spaced side members and wall members interconnecting said side members along opposed first edges thereof, the unconnected second edges of the respective half members being in overlapping relationship with another.

References Cited

UNITED STATES PATENTS

| 2,980,370 | 4/1961 | Takacs | 244—130 |
| 3,041,992 | 7/1962 | Lee | 244—130 |

MILTON BUCHLER, *Primary Examiner.*

J. PITTENGER, *Assistant Examiner.*